United States Patent [19]

Denko

[11] 4,196,430

[45] Apr. 1, 1980

[54] ROLL-UP METHOD FOR A DISPLAY UNIT

[75] Inventor: Masatoshi Denko, Ome, Japan

[73] Assignee: Tokyo Shibaura Electric Co., Ltd., Tokyo, Japan

[21] Appl. No.: 871,112

[22] Filed: Jan. 19, 1978

[30] Foreign Application Priority Data

Jan. 21, 1977 [JP] Japan .................................. 52-5482

[51] Int. Cl.[2] ........................................ G06K 15/20

[52] U.S. Cl. .................................... 340/726; 340/799

[58] Field of Search ........................ 340/324 AD, 726

[56] References Cited

U.S. PATENT DOCUMENTS

| | | | |
|---|---|---|---|
| 3,593,310 | 7/1971 | Kievit | 340/324 AD |
| 3,623,068 | 11/1971 | Horgan et al. | 340/324 AD |
| 3,742,482 | 6/1973 | Albrecht et al. | 340/726 |
| 4,068,225 | 1/1978 | Lee | 340/324 AD |
| 4,101,879 | 7/1978 | Kawaji et al. | 340/324 AD |

*Primary Examiner*—David L. Trafton
*Attorney, Agent, or Firm*—Cushman, Darby & Cushman

[57] ABSTRACT

A roll-up method for a display unit according to this invention consists of supplying data for designating a roll-up region to a roll-up address counter to designate an address for a refresh memory storing a character display data portion and a control data portion and modifying the contents of said address counter to modify the stored information of said refresh memory in a fly-back time of the display unit by means of a roll-up instruction, thereby rolling up said region.

6 Claims, 4 Drawing Figures

ROLL-UP METHOD FOR A DISPLAY UNIT

BACKGROUND OF THE INVENTION

This invention relates to a roll-up method for a specified region of a displayed picture, used with a display unit for electronic computer.

Already known is the so-called roll-up method in which a displayed data is shifted row by row. Recently, however, the pictures of display units have often been serving for multi-purpose applications, such as simultaneous display of system message and file content. It has not been easy to roll-up a region displaying the system message alone without rolling up a region displaying the file content, for example. The reason for this is that, in the prior art method, the content of a refresh memory corresponding to the displayed data is read in a main memory, the aforesaid roll-up process is conducted in accordance with a specially prepared program, and the processed content is transmitted to the refresh memory through complicated steps of procedure. Moreover, there has been an increasing requirement for more sophisticated roll-up functions. In general, a format of a data to be stored in the refresh memory consists of a character display data portion and a control data portion to provide shading display, blink display, protective effect, etc. for characters included in the character display data portion. In rolling up the character display data portion, it should be decided according to the purpose of display whether or not to roll up the control data portion along with the character display data portion. In rolling up the system message, for example, the control data portion is preferably rolled up. When similar data are successively applied to the input by the key operation, especially when data inputted in records are rolled up, however, the control data portion should not be rolled up.

In such sophisticated roll-up operation as described above, use of the conventional system would complicate the software and require more roll-up time.

SUMMARY OF THE INVENTION

An object of this invention is to provide a roll-up method for a display unit in which a designated region in a picture on the display unit may be easily and securely rolled up without modifying the information stored in a main memory. Another object of the invention is to provide a roll-up method for a display unit which enables us to roll up both character display data and control data portions of information to be displayed as well as to roll up the character display data portion only, at our option.

In order to attain the above objects, the roll-up method for a display unit of the invention consists of supplying data for designating a roll-up region to a roll-up address counter to designate an address for a refresh memory storing a character display data portion and a control data portion and modifying the contents of said address counter to modify the stored information of said refresh memory in a fly-back time of the display unit by means of a roll-up instruction, thereby rolling up said region.

When the display is rolled up by this method, the roll-up operation may be accomplished in an easy and simple system without requiring the complicated process of modifying the stored information of the main memory.

Further, if the character display data portion and control data portion are rewritten at the same time in rewriting the stored information required for the roll-up operation, both these data portions may be rolled up. On the other hand, if the character display data portion alone is rewritten, the roll-up operation may be conducted only for the character display data portion. Since such selection of the manner of operation can be made depending merely on whether or not the control data portion employed for the rewriting is supplied to the refresh memory, the command program may duly be simple, being effectively used for the improvement of expressing capability of the displayed characters.

DETAILED DESCRIPTION OF THE PREFERRED EMBODIMENTS

Figure 1:
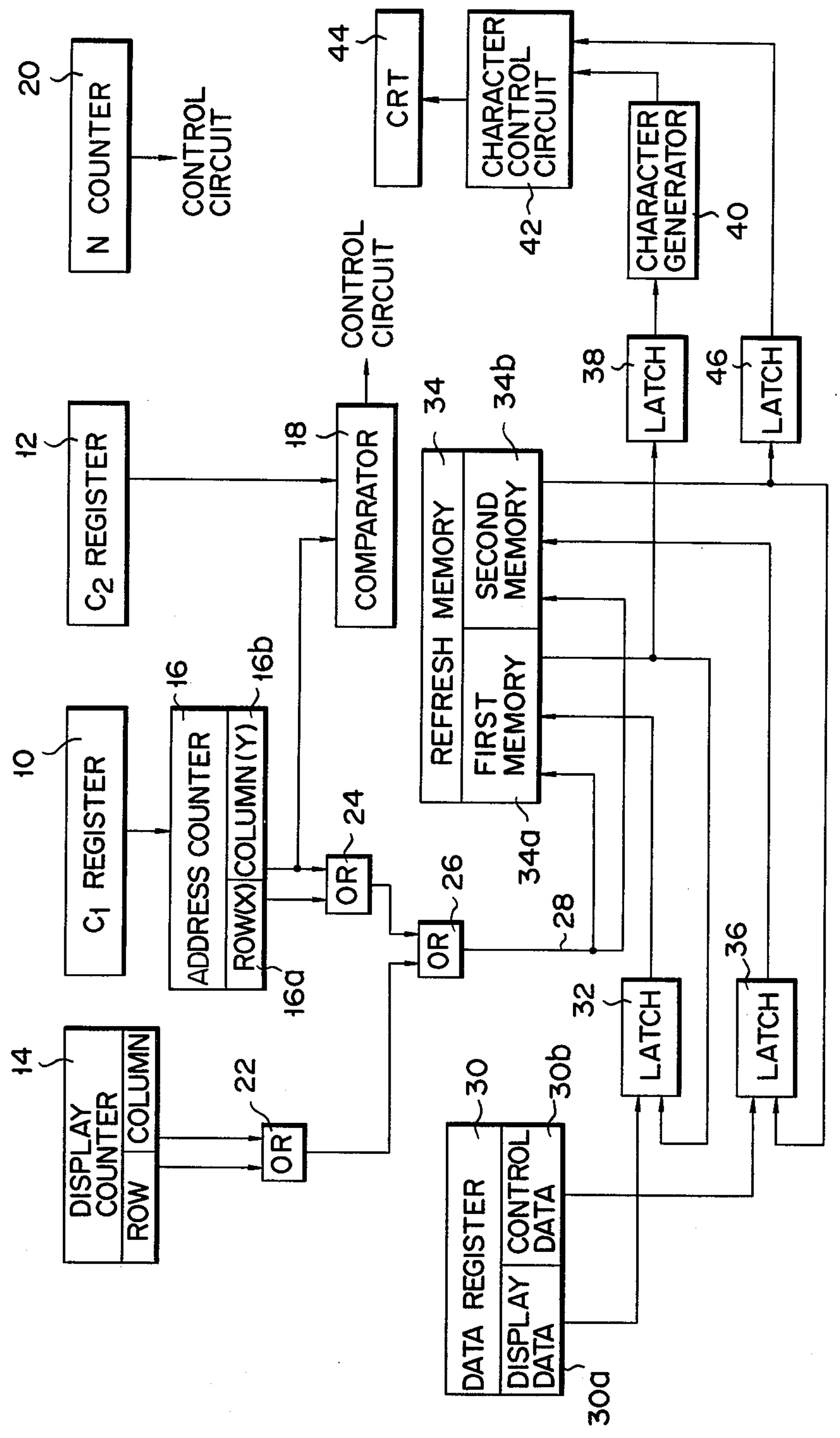
FIG. 1 is an example of block diagram employed in effectuation of the roll-up method of this invention.

Referring now to FIG. 1, numeral 34 designates a refresh memory for storing information or data to be displayed on a display unit, such as CRT 44. The refresh memory 34 is composed of a first memory portion **34*a* to store a character display data portion of the format of said information and a second memory portion 34*b* to store a control data portion of said format such as blink display, protective effect, inverse effect and shading effect, etc. The refresh memory 34 is formed of a RAM, while numeral 28 denotes an address line. The address line 28 is supplied with the output of a display counter 14 through OR gates 22 and 26. Also, the address line 28 is supplied through OR gates 24 and 26 with the output of a roll-up address counter 16 composed of a row counter 16*a* and a column counter 16*b*. The display counter 14 counts when displaying a picture, and reads out pertinent data from the refresh memory 34. Among the read data, those read out from the first memory portion 34*a* are supplied to a character generator 40 formed of a ROM after being temporarily stored in a latch 38, and an output transmitted from the character generator 40 is delivered to a character control circuit 42. A signal from the character generator 40, which is delivered to the character control circuit 42, is transmitted to a CRT 44 after being controlled by a signal from the second memory portion 34*b***.

The respective outputs from the row counter **16*a* and column counter 16*b* that form the address counter 16 are transmitted to the address line 28 as address signals for reading out the stored data from the refresh memory 34 in a set of fly-back time during the display operation of the CRT 44**.

Numeral 10 designates a column-start register of C1 register whose content is set in the column counter **16*b*. Numeral 12 denotes a column-limit register or C2 register whose content is transmitted to a comparator 18, where it is compared with the value given by the column counter 16*b*. If both these values are coincident with each other, then a coincidence signal is transmitted to a control circuit (not shown). Further, numeral 20 designates a length counter or N counter which performs down-count operation with every counting operation of the row counter 16***a*, and a zero detection signal is transmitted to the control circuit when the control value from the N counter 20 becomes zero. Numeral 30 denotes a data register which comprises a first data register portion 30*a* for the character display data portion of the format of information or data to be displayed and a second data register portion 30*b* for the control data portion of said format. The first and second data register portions 30*a* and 30*b* can write or read required data in or out of the first and second memory portions 34*a* and 34*b* of the refresh memory 34 through latches 32 and 36, respectively.

Figure 2:
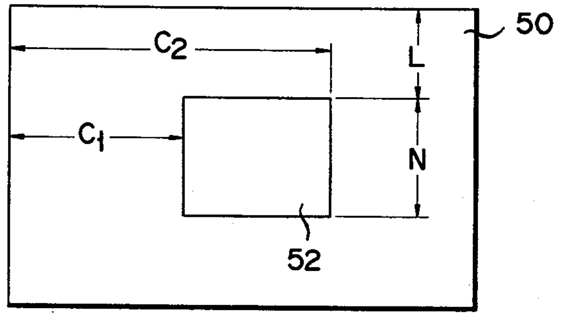
FIG. 2 shows a roll-up region in a display picture and parameters to determine said region.

Now there will be described the roll-up operation of the invention effectuated by using a device with the above-mentioned configuration. The description herein refers to a case in which the roll-up operation is applied to a region 52 defined in a picture 50 by means of parameters L, C1, C2 and N, as shown in FIG. 2.

Figure 3:
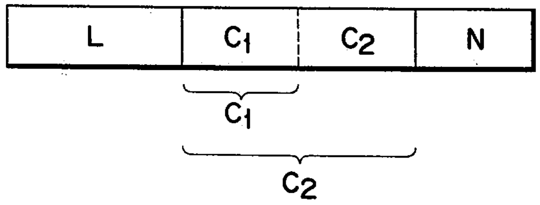
FIG. 3 shows an example of a designation signal for the parameter region including parameter information as shown in FIG. 2.

In executing the roll-up operation, a roll-up instruction, as shown in FIG. 3, is first produced from a CPU (not shown), and the roll-up region 52 is specified by the roll-up data or parameters L, C1, C2 and N included in the instruction. FIG. 2 shows that the region 52 covers N rows starting at Lth row from the upper edge of the picture and laterally extends from C1'th column to C2'th column as counted from the left edge of the picture. The aforesaid parameters are transmitted from the CPU; the values of L, C1, C2 and N are set in the row counter 16*a*, column counter 16*b* via the column register 10, column-limit register 12, and length counter 20, respectively. Circuits to connect the CPU with the respective parts are omitted for the simplicity of the drawing.

In the region 52 defined by the above parameters there is successively conducted the roll-up operation with every row, while, in doing this, there may be executed a first operation to roll up both the character display data portion and control data portion, or a second operation to roll up the character display data portion alone. In an example of method for effectuating these two operations, the first operation is accomplished by supplying the roll-up data from the CPU to the row counter 16*a*, column-start register 10, column-limit register 12, and length counter 20 and supplying the control information portion or control data from the CPU to the second memory portion 34*b* through the data register 30, while the second operation to roll up the character display data portion alone is achieved by supplying the roll-up data only.

Turning now to the flow chart of FIG. 4, there will be described the roll-up operation. In displaying on the display unit or CRT 44 the data stored in the first memory portion 34*a* of the refresh memory 34, the address of the refresh memory 34 is successively designated by the display counter 14, and the data read out by such address designation are set in latches 38 and 46. Among these read data the character display data read out from the first memory portion 34*a* are transmitted through the character generator 40 to the character control circuit 42, where they are controlled by the data or control information portion delivered from the second memory portion 34*b*, transmitted as video signals to the CRT 44, and displayed.

Figure 4:
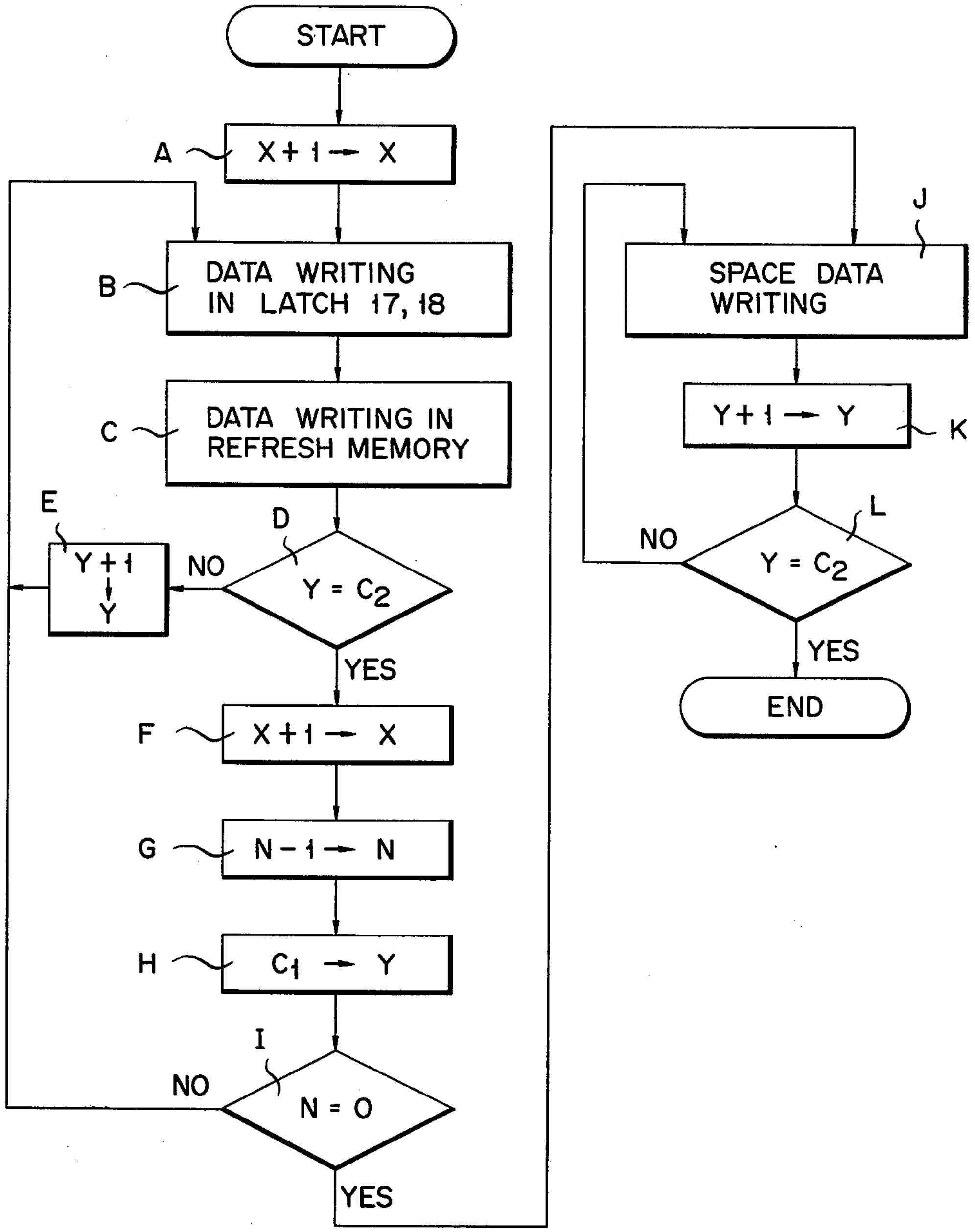
FIG. 4 is a flow diagram illustrating the operation of the embodiment of FIG. 1.

When the roll-up data given by the CPU are set respectively in the pertinent registors and counters, 1 (one) is first added to the initial content of the row counter 16*a* at that time, that is, 1 (one), as shown in Step A of FIG. 4, by means of a well-known control circuit (not shown), and the second row for the region 52 (FIG. 2) is designated. In FIG. 4, X is a number to indicate where a row in the roll-up region 52 is from the upper edge of the picture, while Y is a number to indicate where a column in the roll-up region 52 is from the left edge of the picture 50.

Subsequently, as shown in Step B, the content of the refresh memory 34 is read out by address signals transmitted from the row counter 16*a* to designate Xth row and the column counter 16*b* to designate Yth column, and is set in the latches 38 and 46. The address designation for the refresh memory 34 by the row counter 16*a* and column counter 16*b* is achieved, taking advantage of the fly-back time of the CRT.

Turning now to Step C, the content of the row counter 16*a* is reduced to the remainder obtained by subtracting 1 (one) from the then content, thereby restoring the preceding state, that is, the initial state in which the first row in the region 52 is to be designated, in this case, and then the data set in the latches 38 and 46 in Step B are written in the address of the refresh memory 34 designated by the row and column counters 16*a* and 16*b*.

Thereafter, as shown in Step D, the content of the column register 16*b* and the content C2 of the column-limit register 12 are compared by the comparator 18. If these contents are not coincident with each other, then 1 (one) is added to the content of the column counter 16*b* in Step E, which is restored to Step B.

By repeating the aforesaid Steps B, C, D and E, the content of each column in the second row of the region 52 is rewritten for the first row. When such rewriting is completed, a coincidence signal is transmitted from the comparator 18 in Step D, and then Step F is attained.

In Step F, 1 (one) is added to the content of the row counter 16*a*, then there comes Step G. In Step G 1 (one) is subtracted from the content N of the length counter 20.

Subsequently, in Step H, the content of the column-start register 10 is again given in the column counter 16*b*. Then, as shown in Step I, there is passed judgment on whether or not the then content N (the remainder obtained by subtracting 1 (one) from the initial value of N) of the length counter 20 is 0 (zero). If the result of such judgment is not 0 (zero), then Step B is resumed and the aforementioned steps of operation are repeated. In Step I, among these repeated steps of operation, the content of the counter 20 is equal to the remainder obtained by subtracting the number of repeated steps of operation from N.

When rewriting of all the rows of the region is completed as aforesaid, the content of the length counter 20 comes 0 (zero), and the judgment result in Step I appears as YES, which is followed by Step J. In this Step J, the space data is written in the first memory portion 34*a* (to store the character display data) of the refresh memory designated by the roll-up address counter 16. Subsequently, as shown in Step K, 1 (one) is added to the content of the column register 16*b*, when Step L is attained. In Step L, a decision is made as to whether or not the content of the column counter 16*b* is coincident with the content C2 of the column-limit register 12. If they are not coincident with each other, Step J is resumed, and steps J, K and L are repeated. By such repetition of Steps J, K and L, space data are successively written in the first memory portion 34*a* of the refresh memory 34 for the lowermost row of the region 52. When all these cycles of writing are completed, a coincidence signal is transmitted in Step L, and the roll-up operation is finished by said signal.

In the above embodiment there has been described the case in which the character display data portion and control data portion are rolled up at the same time. In rolling up the character display data portion alone, however, the content of the latch 38 alone is written in the refresh memory 34 in Step C without writing the content of the latch 46 in the refresh memory. For other Steps, the same procedure as illustrated in FIG. 4 is to be taken.

Thus, according to this invention, there may be obtained a roll-up method for a display unit which enables us easily and securely to roll up a defined picture as well as easily to select the operation to roll up the character display data portion and control data portion at the same time or the operation to roll up the character display data portion alone by modifying the program for operation.

The roll-up operation can be accomplished easily and securely without requiring such complicated process as modification of the stored information of the main memory, because it is carried out chiefly by means of the output signals from the roll-up address counter 14, comparator 18, and length counter 20 provided separately from the main memory.

What is claimed is:

1. A roll-up method for a display unit comprising supplying data for designating a roll-up region to a roll-up address counter to designate an address for a refresh memory storing a character display data portion and a control data portion and modifying the contents of said address counter to modify the stored information of said refresh memory in a fly-back time of the display unit by means of a roll-up instruction, thereby rolling up said region.

2. A roll-up method for a display unit according to claim 1, wherein only said character display data portion is rolled up by modifying the stored information of said refresh memory with respect to said character display data portion alone.

3. A roll-up method for a display unit according to claim 1, wherein both said character display data portion and control data portion are simultaneously rolled up by modifying the stored information of said refresh memory with respect to both said character display data portion and control data portion.

4. A roll-up method for a display unit according to claim 1, wherein said modification of the stored information of said refresh memory includes both said modification for said character display data portion alone and modification for both said character display data portion and control data portion, said modifications being selected by said roll-up instruction.

5. A roll-up method for a display unit according to claim 1, wherein setting of rows covered by said roll-up region is achieved by transmitting a row number at which roll-up is started to said refresh memory through a row counter included in said address counter and setting the number of rows covered by said roll-up region in a length counter; the content of said length counter being subjected to successive subtraction therefrom of 1 (one) with every completion of roll-up by a row, an output signal being transmitted when the result of said subtraction is reduced to 0 (zero), a space data being successively read in for a subsequent row in accordance with said output signal.

6. A roll-up method for a display unit according to claim 5, wherein determination of the position and number of rows covered by said roll-up region by setting in a column-start register the number of a column to be initially rolled up, thereby supplying said number to said refresh memory through a column counter included in said address counter, said column counter being again set in accordance with the content of said column-limit register on completion of roll-up by a row, and setting in said column-limit register the number of a column to be finally rolled up out of the columns at each end of said roll-up region; the column number set in said column-limit register being transmitted along with the output signal of said column counter to a comparator, which transmits an output signal when said column number is coincident with said output signal of said column counter, a space data for a subsequent row being read in said refresh memory in accordance with said output signal of said comparator.

* * * * *